Figure 1A:
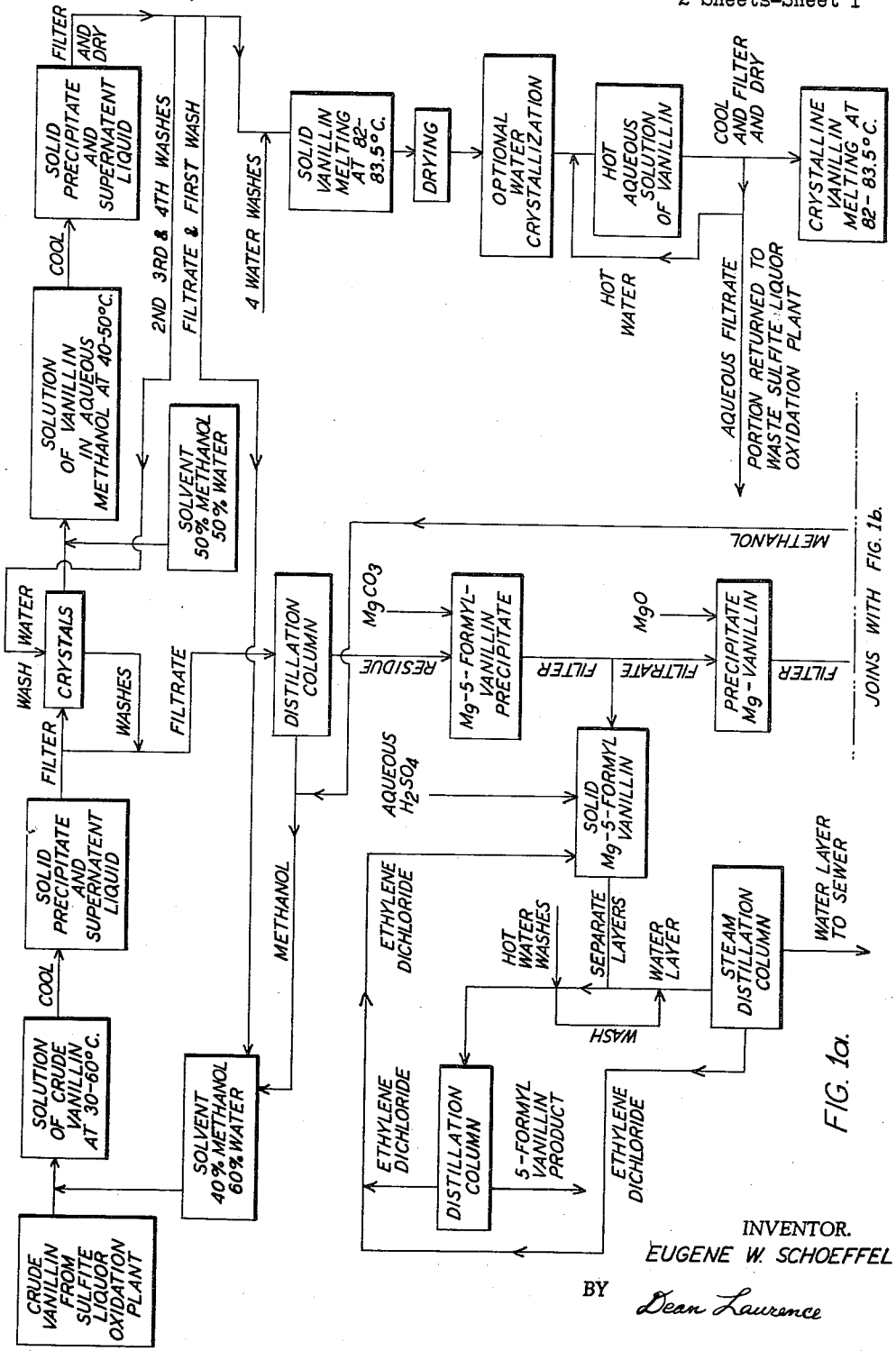
Figure 1B:
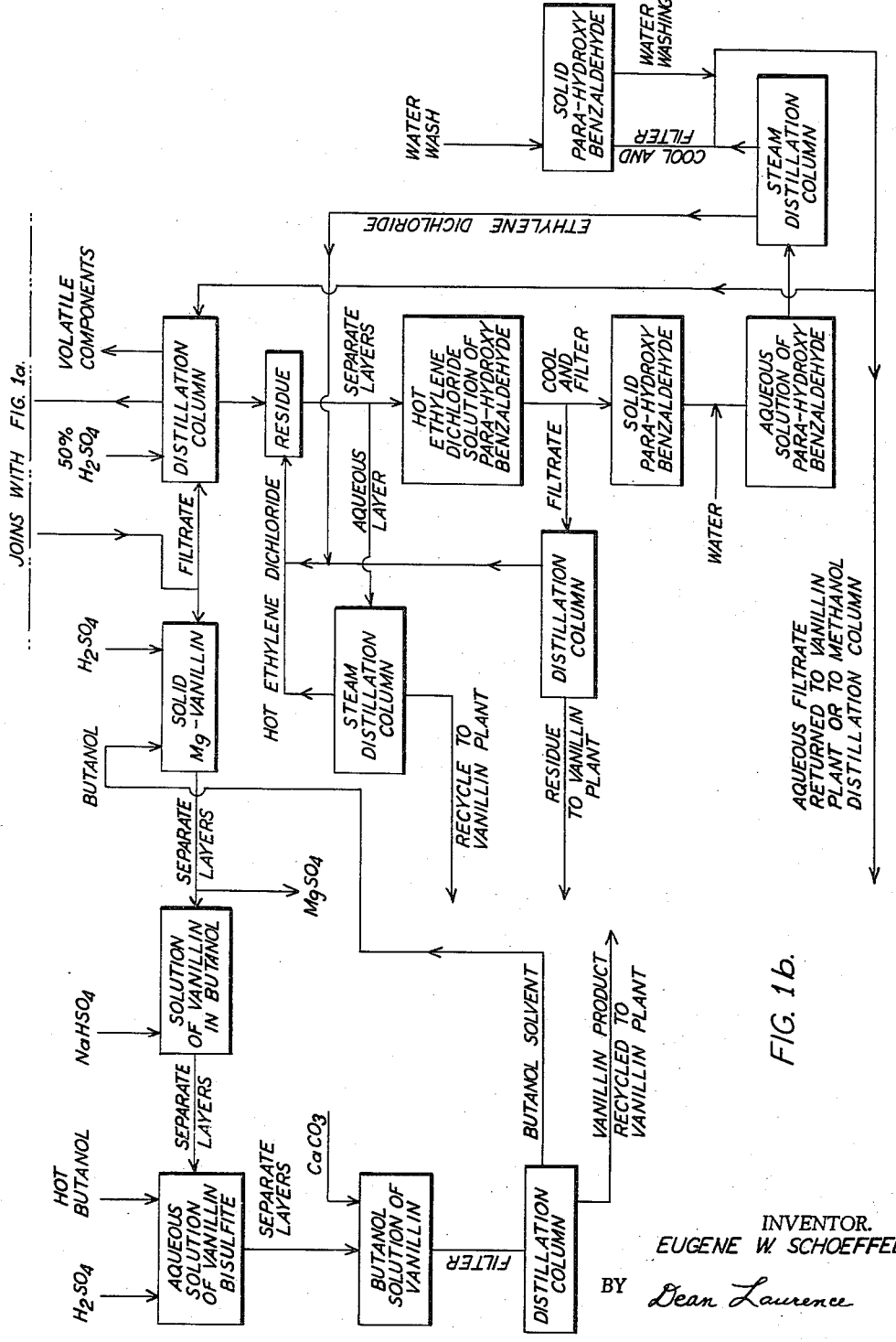

Aug. 14, 1962  E. W. SCHOEFFEL  3,049,566
VANILLIN PURIFICATION
Filed Oct. 17, 1958  2 Sheets-Sheet 1

INVENTOR.
EUGENE W. SCHOEFFEL
BY Dean Laurence
ATTORNEY

Aug. 14, 1962

E. W. SCHOEFFEL 3,049,566

VANILLIN PURIFICATION

Filed Oct. 17, 1958

2 Sheets-Sheet 2

INVENTOR.
EUGENE W. SCHOEFFEL

BY *Dean Laurence*

ATTORNEY

United States Patent Office 3,049,566
Patented Aug. 14, 1962

3,049,566
VANILLIN PURIFICATION
Eugene W. Schoeffel, Kronenwetter, Wis., assignor, by mesne assignments, to American Can Company, New York, N.Y., a corporation of New Jersey
Filed Oct. 17, 1958, Ser. No. 767,950
2 Claims. (Cl. 260—600)

The present invention relates to the purification of vanillin and more particularly relates to a process for continuously purifying crude vanillin to achieve pure, crystalline white vanillin and recover separately some of the compounds present as impurities in the crude vanillin.

While natural vanillin is extracted from the vanilla bean, several methods are known for the chemical preparation of vanillin. One such method involves a chemical reaction with guaiacol, a relatively expensive derivative of coal tar. Another method involved the partial oxidation of lignin in an alkalinized waste sulfite liquor. Because of the favorable economic factors involved, the partial oxidation of waste sulfite liquor has generally been the most widely used chemical source of vanillin. However, only about 9 percent of the waste sulfite liquor is converted to vanillin, the remainder being impurities which must be eliminated.

The aforementioned methods have produced a crude vanillin, having many impurities therein that render the product unsuitable where high purity is required. Pure vanillin has a melting range of 82–83.5 degrees centigrade, white crystalline appearance, produces colorless solutions, and is colorless in the liquid state. Crude vanillins contain impurities that lower the melting point, produce colored solutions, and color the liquid state. These impurities are compounds containing phenolic and carbonyl groups with solubilities similar to vanillin. The three main impurities present in crude vanillin obtained from guaiacol are isovanillin, guaiacol and orthovanillin. A crude vanillin distillate obtained from lignin contains about 90 percent vanillin and about 10 percent impurities and has a melting range of 62–78 degrees centigrade. The characteristics of a particular crude vanillin depend on the ratio and composition of the impurities and the moisture content. The main impurities of crude vanillin derived from lignin are 5-formylvanillin, para-hydroxybenzaldehyde and acetovanillone. Other impurities such as dehydro-di-vanillin, 5-carboxyvanillin and oxystilbene are present to some extent but have been largely removed by the routine purification and extraction procedures during the prior production of the crude vanillin from lignin.

The present invention resides in the concept of a process for purifying crude vanillin by dissolving crude vanillin in a solvent mixture of water and 40 to 60 percent by weight of methanol, preferably 40 percent by weight methanol; crystallizing vanillin-containing solid from the solution; dissolving the vanillin-containing solid in a solvent mixture of water and 40 to 60 percent by weight methanol, preferably 50 percent by weight methanol; crystallizing from the solution pure white vanillin having a melting range of 82–83.5 degrees centigrade; separating methanol and recycling the separated methanol to form the vanillin solutions; and separating vanillin and other compounds from the filtrates, whereby a continuous process is achieved for producing a high yield of pure vanillin and selectively isolating impurity compounds present in the crude vanillin.

Throughout the specification, the term "percent" alone means percent by weight.

A physical embodiment of the invention is illustrated in the accompanying drawing showing a flow sheet of the purification according to the invention of crude vanillin derived from lignin. Following is a general description of the embodiment of the invention illustrated in the accompanying drawing.

Crude vanillin distillate containing about 85–90 percent vanillin and derived from the partial oxidation of lignin in sulfite waste liquor is dissolved in a solvent mixture of 40 percent methanol and 60 percent water.

The solution is cooled with the resultant precipitation of a somewhat purified vanillin-containing solid having a melting range of 82–83 degrees centigrade. The solid is filtered and dissolved in a solvent mixture of 50 percent methanol and 50 percent water. The solution is cooled with the precipitation of crystalline, white vanillin melting at 82–83.5 degrees centigrade. The vanillin is filtered and dried. If a water crystallization is desired, the vanillin is dissolved in hot water and the solution cooled to produce a water crystallized vanillin. The vanillin is centrifuged from the mother liquor and dried.

The filtrate of the first crystallization is distilled to remove methanol that is recycled to form the first solution of crude vanillin. The residue remaining after distillation is thereafter selectively treated to separate 5-formylvanillin, vanillin, and para-hydroxy-benzaldehyde. The impurities can be separated by treating the residue with zinc acetate solution, zinc sulfate solution, magnesium carbonate or magnesium oxide. Preferably, as in the illustrated embodiment of the invention, the impurities are selectively separated as substantially pure compounds by the following procedure.

The residue is treated with magnesium carbonate with the resultant precipitation of magnesium 5-formylvanillinate, which is filtered. The filtered precipitate is moistened with aqueous 50 percent sulfuric acid and thereafter extracted with ethylene dichloride. The ethylene dichloride solution is distilled to remove ethylene dichloride and produce substantially pure 5-formylvanillin.

The filtrate remaining after removal of magnesium 5-formylvanillinate is treated with magnesium oxide with the resultant precipitation of magnesium vanillinate that is filtered. Aqueous 50 percent sulfuric acid is added to the magnesium vanillinate precipitate and the vanillin extracted with butanol. The vanillin is recovered from the butanol solution.

The filtrate remaining after removal of magnesium vanillinate is acidified, concentrated, and extracted with hot ethylene dichloride to remove the para-hydroxybenzaldehyde. The ethylene dichloride solution is separated from the aqueous layer and cooled to precipitate para-hydroxybenzaldehyde. The mother liquor contains the acetovanillone.

There now follows a specific description of the physical embodiment of the invention illustrated in the accompanying drawing.

Fit a 5 liter 3-necked flask with a thermometer, stirrer and condenser. Add to the flask 1450 grams of crude vanillin derived from lignin and 1170 cubic centimeters of a solvent mixture of 60 percent water and 40 percent methanol. Stir and warm the contents through the temperature range of 30–60 degrees centigrade to dissolve the crude vanillin in the solvent mixture. After all the vanillin dissolves, cool the contents of the flask rapidly to 23–25 degrees centigrade. Seed the solution with one gram of crystalline vanillin obtained from the end product of this process. Continue stirring the solution. Crystals soon appear and the temperature rises slightly. Maintain the temperature of the mixture within ±2 centigrade degrees of the initial crystallization temperature for one hour. Thereafter, while stirring steadily, slowly cool the contents of the flask over a period of about three hours to reach a temperature of about 5 degrees centigrade at the end of the three hour period. Maintain the mixture at 5 degrees centigrade for an additional two hours.

Filter the crystalline mass. Wash the solid filter cake with four successive portions each of 250 cubic centimeters of water having a temperature of 0–5 degrees centigrade. Continue to draw air through the filter funnel until the solid is substantially air dry. The dry solid weighs 1110 grams ±20 grams and melts at 81–82 degrees centigrade. Combine the filtrate and washings.

Determine the dry vanillin and moisture content of the solid filter cake by weighing a portion of the cake, drying it at about 60 degrees centigrade for three days, weighing the dried portion, and computing the moisture content and the vanillin content. Knowing the vanillin and moisture content of the solid filter cake, prepare a mixture of methanol and water that, when combined with the 1110 gram solid, will produce 1110 cubic centimeters of a mixture of exactly 50 percent methanol and 50 percent water in which the solid will dissolve.

Add the prepared mixture of methanol and water to the previously used 5 liter 3-necked flask fitted with a thermometer, stirrer and condenser. Add the 1110 gram solid filter cake to the flask. Warm the mixture, while stirring, to 40–50 degrees centigrade to produce a slightly colored solution. Thereafter, the solution is rapidly cooled to about 35 degrees centigrade. Then seed the solution with 1 gram of finished pure vanillin. Next, while stirring constantly, slowly cool the mixture for one hour to 32 degrees centigrade. Crystallization begins and the temperature starts to rise. Maintain the mixture at a temperature between about 30–34 degrees centigrade for one hour. Thereafter, while stirring, slowly cool the mixture over a period of two hours to reach a temperature of 13 degrees centigrade. Filter the crystalline solid. Wash the solid with four portions of 250 cubic centimeters of water at a temperature of 0–13 degrees centigrade. Suck air through the filter funnel to substantially air dry the solid. Dry the solid to produce 1000±20 grams of pure, white crystalline vanillin, melting at 82–83.5 degrees centigrade. This vanillin is colorless in the liquid state and forms a colorless solution.

Combine the wash water from the first wash of the preceding paragraph, containing most of the methanol, with the filtrate. Return the combination to the crude vanillin and employ it as part of the aqueous 40 percent methanol solvent mixture. Return the second, third, and fourth wash waters to the first crystallization and employ them as wash waters for the first solid precipitate.

The recovered liquids from the second crystallization have the following composition:

|  | Filtrate | First wash portion | Residue washes |
|---|---|---|---|
| Volume, cc | 950 | 250 | 750 |
| Aldehyde as vanillin, grams | 80 | 20 | 7 |
| Vanillin, grams | 72 | 19 |  |
| Para-hydroxy benzaldehyde, grams | 2.4 | 0.6 |  |
| 5-formylvanillin, grams | 0 8 | 0.2 |  |
| Acetovanillone, grams | 2.7 | 0.7 |  |
| Methanol, cc | 340+ | 90+ | Trace |

In order to produce a water crystallized vanillin, dissolve the crystalline vanillin in sufficient hot water maintained at about 90 degrees centigrade that the concentration of the resulting solution is about 45 grams of vanillin per liter of solution. Next, cool the solution until crystallization begins at about 50 degrees centigrade. Maintain the temperature at about 45 degrees centigrade for two hours. Then slowly cool the mixture to reach a temperature of 13 degrees centigrade in three hours. Next, maintain the temperature at about 13 degrees centigrade for one hour to complete crystallization. Filter the crystals through a filter funnel. Suck air through the solid filter cake to substantially air dry the crystals. Then completely dry the crystals to produce pure white crystalline vanillin in crystals that are conveniently handled.

The aqueous filtrate contains 8–10 grams of vanillin per liter of solution. Recycle a portion of the filtrate to form part of the hot water solvent employed in the previous paragraph. Also, return another portion of the filtrate to the waste sulfite liquor oxidation plant for use in making bisulfiting solution and various diluents employed in the process.

The combined filtrate and washings from the first alcohol crystallization contain methanol which can be separated and used in the formation of the solutions of vanillin in aqueous methanol. The combined filtrate and washings also contains the following dissolved solids: 60–70 percent vanillin, 25–35 percent para-hydroxybenzaldehyde, 6–9 percent 5-formylvanillin, and 4–6 percent acetovanillone. The following procedures effectuate the separation of the methanol, 5-formylvanillin, vanillin and para-hydroxybenzaldehyde. A residue resulting from the following procedures contains the bulk of the acetovanillone.

The combined filtrate and washings from the first crystallization has a volume of 2100 cubic centimeters and contains:

210±20 grams vanillin
91±5 grams para-hydroxybenzaldehyde
20±5 grams 5-formylvanillin
13±3 grams acetovanillone
430+ cubic centimeters methanol Distill the combined filtrate and washings from the first vanillin crystallization to remove methanol. Recycle the methanol to form the first solution of crude vanillin in aqueous methanol.

To the residue from the distillation, add 8.0 grams of magnesium carbonate for each liter of residue solution. Stir the mixture while maintaining the temperature at 50–60 degrees centigrade for about 1 hour. A precipitate of magnesium 5-formylvanillinate forms that is a fine powder that is difficult to filter and centigrade. For filtration, it requires a filter cloth with pores in excess of 400 mesh to produce a clear separation. A 720 mesh stainless steel cloth gives a clear separation immediately whereas 400 mesh cloth permits some of the precipitate to pass through the filter at the start of the filtration. The use of a high speed centrifuge is advantageous.

While keeping the mixture hot, filter it under a pressure of 30 pounds per square inch guage through a 2 inch diameter filter made of 720 mesh stainless steel cloth. The filtration is completed in 1–2 hours. Wash the filtered precipitate with two 50 cubic centimeter portions of methanol maintained at about 50 degrees centigrade. Combine the filtrate and washings and separate vanillin therefrom as outlined below.

Place the damp solid magnesium 5-formylvanillinate in a flask equipped with a mechanical stirrer and a thermometer. Add 17.5 grams of aqueous 50 percent sulfuric acid and 25 cubic centimeters of ethylene dichloride. Warm the mixture to 70–80 degrees centigrade and stir. The magnesium sulfate produced dissolves in the water layer and 5-formylvanillin dissolves in the ethylene dichloride layer. Separate the ethylene dichloride layer from the aqueous layer. Extract the aqueous layer with another 25 cubic centimeter portion of hot ethylene dichloride. Combine the ethylene dichloride extracts and wash them with two 5 cubic centimeter portions of water at 60–80 degrees centigrade.

Combine the water washes with the aqueous layer and steam distill the combination to remove ethylene dichloride. Return the separated ethylene dichloride to the extraction of the 5-formylvanillin. The aqueous residue from the steam distillation, containing the water-soluble magnesium sulfate and less than 5 grams per liter of aldehyde computed as vanillin, is vented to the sewer.

Place the combined ethylene dichloride extracts in a distillation column. Distill the ethylene dichloride off under atmospheric pressure. Place the residue in a vacuum distillation apparatus equipped with an oil bath. At a reduced pressure of 2 millimeters of mercury, distill the 5-formylvanillin at 173–175 degrees centigrade using an oil bath temperature of 168–189 degrees centigrade. Pure 5-formylvanillin is obtained.

Now the combined filtrate and washings from the crystallization of magnesium 5-formylvanillinate are treated to separate vanillin therefrom. Warm the combined filtrate and washings to 50–60 degrees centigrade while stirring. Add about 26 grams of magnesium oxide for each liter of combined filtrate and washings. Employ commercial grade of magnesium oxide that assays about 90.8 percent magnesium oxide. The magnesium oxide dissolves temporarily and a temperature increase of 3–8 centigrade degrees occurs. In less than 60 seconds after the solution forms, magnesium vanillinate precipitates copiously from the solution. Stir the mixture for 1 hour at 50–60 degrees centigrade. Filter the solid precipitate over a 100 mesh stainless steel cloth under a pressure of less than 10 pounds square inch gauge. Wash the precipitate cake with three 87 cubic centimeter portions of hot water at 80–90 degrees centigrade. Combine the wash waters with the filtrate and transfer to the para-hydroxybenzaldehyde recovery system described below.

Place the damp magnesium vanillinate, weighing about 200 grams dry, in a flask fitted with a thermometer and stirrer. Add hot aqueous 50 percent sulfuric acid at a temperature of 80–90 degrees centigrade. Add 100 cubic centimeters of hot water and an excess of butanol. Stir the mixture while maintaining it at 80–90 degrees until the vanillin dissolves in the butanol phase. Separate the butanol phase. Extract the vanillin from the butanol phase with an aqueous solution of 20 percent sodium bisulfite. Separate the aqueous bisulfite phase from the butanol phase. Add sulfuric acid to the aqueous phase to decompose the vanillin bisulfite. Extract the vanillin from the aqueous phase by mixing with hot butanol. Hot ethylene dichloride can also be used as the extractant. Separate the hot butanol phase from the aqueous phase. Add calcium carbonate to the butanol solution to effect neutralization. Next, filter the mixture to separate any solid material. Distill the filtrate to remove butanol solvent. Steam distillation can also be employed. Place the residue remaining after removal of the butanol solvent in a vacuum distillation apparatus. Vacuum distill the residue to produce vanillin having the following composition:

97 percent vanillin;
Less than 2 percent para-hydroxybenzaldehyde;
Less than 1 percent 5-formylvanillin;
Less than 1 percent acetovanillone;
Less than 0.1 percent other impurities.

This vanillin fraction is returned to the alkaline bisulfite stage of the prior sulfite liquor oxidation plant in order to effectuate removal of the acetovanillone.

The combined filtrate and washings from the filtration of the crystallized magnesium vanillinate has the following approximate composition:

Less than 10 grams vanillin per liter of solution;
Less than 50–75 grams para-hydroxybenzaldehyde per liter of solution;
Less than 5 grams of 5-formylvanillin per liter of solution;
Less than 7 grams of acetovanillone per liter of solution;
About 90 grams of total aldehyde computed as vanillin per liter of solution;
30–35 percent by volume of methanol.

This combined filtrate and washings is treated to remove para-hydroxybenzaldehyde therefrom by the following procedure. Neutralize the combined filtrate and washings by adding aqueous 50 percent sulfuric acid until a pH of 4.5–5.0 is achieved. Fractionally distill the acidified solution to remove a fraction containing 90–100 percent methanol. Recycle the methanol fraction to form the solvent for the crude vanillin. After the removal of the methanol fraction, further distill to concentrate the residue to a volume of about 160 cubic centimeters. Thereafter, extract the aqueous residue with two 50 cubic centimeter portions of hot ethylene dichloride at a temperature of 60–70 degrees centigrade. Separate the aqueous layer from the ethylene dichloride layer.

Steam distill the separated aqueous layer to recover ethylene dichloride. Recycle the recovered ethylene dichloride to the previous ethylene dichloride extraction step. The aqueous residue remaining after steam distillation contains the bulk of the acetovanillone.

Permit the hot ethylene dichloride extract to settle to separate the water. Separate the settled water layer. Next, cool the ethylene dichloride extract to 10–13 degrees centigrade while stirring. A precipitate forms. Filter the precipitate over a filter maintained at a temperature of 10–13 degrees centigrade. Wash the precipitate with two 25 cubic centimeter portions of ethylene dichloride at 10–13 degrees centigrade. Add these washes to the filtrate. Distill the combined washes and filtrate to remove ethylene dichloride that is returned to the previous ethylene dichloride extraction of para-hydroxybenzaldehyde. Recycle the residue remaining after distillation to the vanillin alkaline liquor charge of the prior waste sulfite liquor oxidation plant.

Dissolve the solid precipitate in water until a concentration of 100–150 grams of para-hydroxybenzaldehyde per liter of solution is obtained. Steam distill the solution at atmospheric pressure to remove ethylene dichloride. Recycle the removed ethylene dichloride to the prior extraction step. Treat the aqueous solution with 2 grams per liter of charcoal and filter to remove solid. Cool the aqueous filtrate to 10–13 degrees centigrade, while stirring, with the resultant precipitation of crystalline para-hydroxybenzaldehyde. Filter the precipitate at 10–13 degrees centigrade. Wash the precipitate with six portions of water at about 13 degrees centigrade, each water wash portion being 5 percent by volume of the filtrate. Dry the precipitate to obtain a yield of 38–60 grams of para-hydroxybenzaldehyde per liter of the combined filtrate and washings from the crystallization of magnesium vanillinate. The dry product assays to have a content of 98–100 percent para-hydroxybenzaldehyde.

Combine the filtrate and six water washings of the previous paragraph and return them to the vanillin alkaline liquor charge of the prior waste sulfite liquor oxidation plant. Or, the combined filtrate and water washings can be recycled to the distillation column where the methanol is removed from the magnesium vanillinate filtrate.

It is thus seen that the invention provides a process for continuously purifying crude vanillin to produce pure, white crystalline vanillin and selectively isolate several impurities present in crude vanillin derived from lignin.

While the invention has been illustrated with a physical embodiment, its scope is limited only by the subjoined claims.

I claim:
1. A process for purifying crude vanillin comprising the steps: dissolving said crude vanillin in an aqueous methanol solvent containing from about 40 to about 60 percent of methanol to form a solution; cooling said solution to form a precipitate; filtering the precipitate; dissolving said precipitate in an aqueous methanol solvent containing from about 40 to about 60 percent methanol to form a second solution; cooling said second solution to form a second precipitate; and, filtering said second precipitate to isolate pure vanillin having a melting range of 82 to 83.5 degrees centigrade.

2. A process for purifying crude vanillin comprising the steps: dissolving said crude vanillin in a solvent mixture of about 40 percent methanol and about 60 percent water to form a solution; cooling said solution to form a precipitate; filtering the precipitate; dissolving said precipitate in a solvent mixture of about 50 percent methanol and about 50 percent of water to form a second solution; cooling said second solution to form a precipitate; and, filtering said precipitate to isolate pure vanillin having a melting range of 82 to 83.5 degrees centigrade.

References Cited in the file of this patent

UNITED STATES PATENTS

| | | |
|---|---|---|
| 1,954,766 | Fischelis | Apr. 10, 1934 |
| 2,069,185 | Hibbert et al. | Jan. 26, 1937 |
| 2,187,366 | Schulz | Jan. 16, 1940 |
| 2,506,540 | Bryan | May 2, 1950 |

OTHER REFERENCES

Weissberger: Part I, Separation and Purification, vol. III, 2nd ed. (1956), p. 556.